Patented Apr. 27, 1943

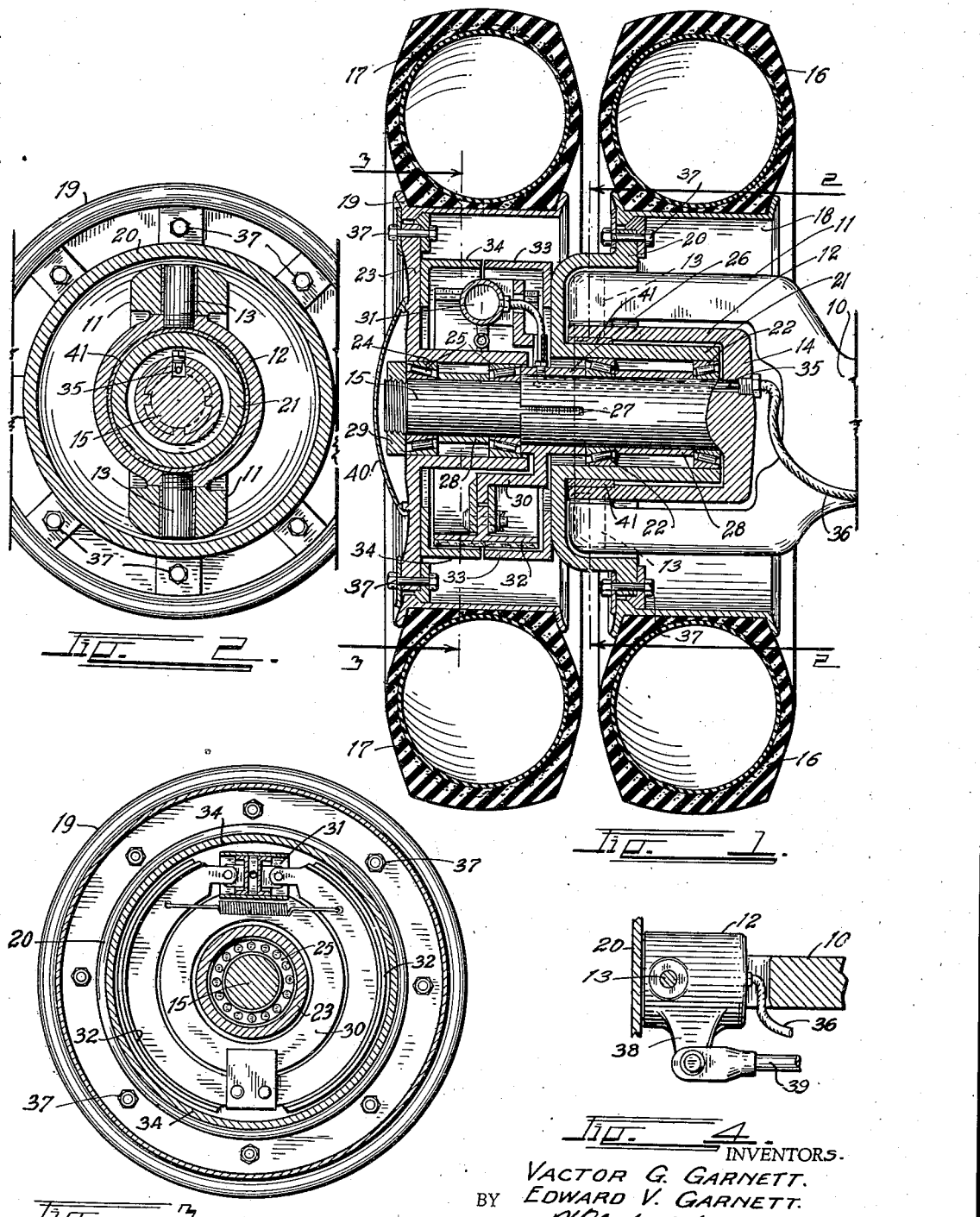

2,317,906

UNITED STATES PATENT OFFICE 2,317,906

DUAL WHEEL CONSTRUCTION

Vactor G. Garnett and Edward V. Garnett, Denver, Colo.

Application April 26, 1941, Serial No. 390,440

13 Claims. (Cl. 280—96.1)

This invention relates to a dual-front wheel mounting for automotive vehicles. In the usual dual-front wheel mounting the two dual wheels are carried on the extremity of a comparatively long, cantilever axle. This places heavy strains on the axle and on the steering mechanism since the entire load is concentrated to one side of the vertical axis of both wheels.

The principal object of this invention is to provide a construction in which the load point or steering pivot will be positioned between the contact planes of the two wheels so that all bending strains on the axle stud and all steering strains on the steering mechanism and the driver will be reduced to a minimum.

In the type of dual-front wheel in which the wheels are carried to one side of the steering spindle a terrific strain is imposed upon the steering spindle and upon the steering mechanism due to the fact that when the brakes are applied, the wheel tires are resisting forward movement to one side only of the steering pivots. Another object of this invention is to so construct the dual-wheel mounting that all reactive strains and stresses due to the application of the brakes will be counter-balanced on both sides of each steering pivot so that all tendency of one wheel to swing the axle rearwardly is counteracted by the opposite reaction of the other wheel on the opposite side of the steering pivot.

Other objects and advantages are: to provide a construction in which both wheels can be quickly and easily removed by removal of a single axle nut; to provide a single set of brake shoes which will operate against a dual set of brake drums so that both wheels of a pair of dual wheels will be simultaneously and uniformly retarded; to provide a structure that can be placed on a typical front axle with the use of standard-sized tires without undue crowding of the various parts; and to provide a structure in which the entire brake mechanism can be exposed for replacement and repairs with the removal of a single wheel.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a vertical axial section through a pair of dual front wheels illustrating the invention in place therein;

Fig. 2 is a vertical section taken on the line 2—2, Fig. 1;

Fig. 3 is a similar section taken on the line 3—3, Fig. 1 and;

Fig. 4 is a detail top view on a reduced scale of the bearing drum employed in the invention.

In the drawing a typical front vehicle axle is indicated at 10 provided with a yoke 11 at each extremity for receiving the steering pivots. A tire of an inner wheel of a pair of dual wheels is illustrated at 16 and a tire of an outer wheel of the pair is illustrated at 17. The tires 16 and 17 are carried on rims 18 and 19, respectively, of any desired design.

A cylindrical supporting drum 12 is pivoted in the yoke 11 upon suitable pivot pins 13 so that it may rotate in a substantially horizontal plane. The drum 12 extends inwardly toward the axle 10 terminating in a closed head 14 from which a stub axle 15 extends outwardly. The stub axle 15 may be an integral part of the drum 12 or may be attached thereto in any desired manner. In any event it occupies a position in alignment with the axis of the drum 12.

The inner rim 18 is mounted, by means of the usual rim bolts 37, on an inner disk wheel 20 which is indented first outwardly around the extremity of the yoke 11 thence continued inwardly within the drum 12 to form a bearing sleeve 21. The bearing sleeve 21 is mounted on suitable anti-friction bearings 22 on the stub axle 15. The outer rim 19 is mounted on an outer wheel 23 which is formed with an outer bearing sleeve 24 which rides on suitable anti-friction bearings 25 on the outer extremity on the stub axle 15. Tubular bearing separators 28 separate each set of bearings 22 and 25 to the proper operating spacing. A brake sleeve 26 is mounted on suitable splines 27 on the axle stub between the wheels and between the two sets of bearings 22 and 25. A single axle nut 29 holds the entire assembly on the axle stub 15 with the various bearings being held in their proper position by the separators 28 and by the brake sleeve 26. The nut 29 is concealed and the bearings are protected from dust and dirt by the means of the usual hub cap 40.

The brake sleeve supports a brake disk 30 within the outer rim 19. This brake disk carries any desired braking mechanism such as a hydraulic cylinder 31 which actuates suitable brake shoes 32 for braking purposes. The brake shoes simultaneously contact the inner surfaces of two brake drums 33 and 34. The drum 33 is secured to the inner wheel 20 and the drum 34 is secured to the outer wheel 23. Both drums are in circumferential alignment with each other and are closely spaced from each other so that the two brake shoes 32 can operate against both drums.

Fluid to actuate the brake cylinder is conducted to the brake drums through a fluid tube 35 which extends in keyway in the stub axle beneath the bearings 22 to a point in alignment with the brake disk 30 thence extends outwardly through a suitable passage in the brake disk to the cylinder 31. The tube 35 can be connected to the hydraulic brake system of the vehicle through any suitable flexible tube 36.

It can be seen that when the brakes are released both wheels can rotate freely and independently of each other. It can also be seen that when the brakes are applied both wheels are thereby uniformly brought to rest.

It is desired to call attention to the fact that the distance between the axis of the pivot pins 13 and the planes of the tires 16 and 17 is equal on both sides of the vertical axis. Therefore, any retarding at the road contact of one wheel will be counterbalanced by the retarding action of the other wheel so that all turning moments about the pivots 13 are reduced to a minimum.

The drum 12 is provided, of course, with a steering arm, such as indicated at 38, Fig. 4, which is connected through a steering tie rod 39 with the car steering gear.

To partially relieve the strain upon the stub axle 15 an annular bearing 41 may be positioned between the bearing sleeve 21 and the interior surface of the drum 12. This bearing will transmit the thrust directly from the stub axle through the bearing 22, the sleeve 21, the drum 12 to the yoke 11.

While the element 12 has been herein described as a cylindrical drum, it can be readily seen that there is no particular reason for its being cylindrical or for its being a complete drum. In fact, the head 14 could be supported on any two top and bottom members extending outwardly to the pivots 13.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A dual wheel construction for vehicles comprising: a hollow non-rotatable bearing member; an axle member supported by and projecting concentrically through the hollow bearing member; a first wheel journalled on said axle member internally of said bearing member; a second wheel positioned closely adjacent said first wheel and journalled on said axle member adjacent said first wheel so that it can be rotated independently thereof, said wheels being journalled respectively on opposite sides of a vertical plane passing between the wheels; and a substantially vertical pivot means for said bearing member to allow the latter to be rotated in a horizontal plane for steering purposes, said pivot means being located in said vertical plane.

2. A dual wheel construction for vehicles comprising: a hollow non-rotatable bearing member; an axle member supported by and projecting concentrically through the hollow bearing member; a first wheel journalled on said axle member internally of said bearing member; a second wheel positioned closely adjacent said first wheel and journalled on said axle member adjacent said first wheel so that it can be rotated independently thereof; and a substantially vertical pivot means for said bearing member to allow the latter to be rotated in a horizontal plane for steering purposes, said pivot means being positioned intermediate the road contact planes of the two wheels.

3. A dual wheel construction for vehicles comprising: a horizontal, cup-like, bearing sleeve the outer extremity of which is open and the inner extremity of which is closed; a stub axle extending from the closed extremity axially through said sleeve and projecting from the open extremity thereof; an inner wheel journalled on the stub axle within the bearing sleeve; an outer wheel journalled on that portion of the stub axle projecting from the open extremity of the bearing sleeve; and a steering pivot for said bearing sleeve, said steering pivot being positioned at a point between the road contact planes of the two dual wheels.

4. A dual wheel construction for vehicles comprising: a horizontal, cup-like, bearing sleeve the outer extremity of which is open and the inner extremity of which is closed; a stub axle extending from the closed extremity axially through said sleeve and projecting from the open extremity thereof; an inner wheel journalled on the stub axle within the bearing sleeve; an outer wheel journalled on that portion of the stub axle projecting from the open extremity of the bearing sleeve; and a steering pivot for said bearing sleeve, said steering pivot being positioned at a point between the road contact planes of the two dual wheels, said inner wheel concentrically surrounding said bearing sleeve, said outer wheel being positioned beyond the bearing sleeve and concentrically surrounding the projecting axle stub.

5. A dual wheel construction for vehicles comprising: a horizontal, cup-like, bearing sleeve the outer extremity of which is open and the inner extremity of which is closed; a stub axle extending from the closed extremity axially through said sleeve and projecting from the open extremity thereof; an inner wheel journalled on the stub axle within the bearing sleeve; an outer wheel journalled on that portion of the stub axle projecting from the open extremity of the bearing sleeve; a brake drum on the inner face of the outer wheel; a second brake drum on the outer face of the inner wheel, said drums being positioned in circumferential alignment and within the outer wheel; braking means for applying frictional retarding pressure to both brake drums simultaneously; and means for supporting said braking means from said stub axle between the two wheels.

6. A dual wheel construction for vehicles comprising: a horizontal, cup-like, bearing sleeve the outer extremity of which is open and the inner extremity of which is closed; a stub axle extending from the closed extremity axially through said sleeve and projecting from the open extremity thereof; an inner wheel journalled on the stub axle within the bearing sleeve; an outer wheel journalled on that portion of the stub axle projecting from the open extremity of the bearing sleeve; a brake drum on the inner face of the outer wheel; a second brake drum on the outer face of the inner wheel, said drums being positioned in circumferential alignment and within the outer wheel; braking means for applying frictional retarding pressure to both brake drums simultaneously; means for supporting said braking means from said stub axle between the two wheels; and brake actuating means extending from the closed extremity of said bearing sleeve through said stub axle to said braking means.

7. A dual wheel construction for vehicles comprising: a horizontal, cup-like, bearing sleeve the outer extremity of which is open and the inner extremity of which is closed; a stub axle extending from the closed extremity axially through said sleeve and projecting from the open extremity thereof; a first set of annular wheel bearings surrounding said stub axle within said bearing sleeve; a second set of annular wheel bearings surrounding said stub axle adjacent the projecting extremity thereof; an inner wheel; a bearing collar extending from said inner wheel into said bearing sleeve and being journalled on said first set of bearings; an outer wheel; and a second bearing collar extending from said outer wheel inwardly around said stub axle and being journalled on said second set of bearings.

8. A dual wheel construction for vehicles comprising: a horizontal, cup-like, bearing sleeve the outer extremity of which is open and the inner extremity of which is closed; a stub axle extending from the closed extremity axially through said sleeve and projecting from the open extremity thereof; a first set of annular wheel bearings surrounding said stub axle within said bearing sleeve; a second set of annular wheel bearings surrounding said stub axle adjacent the projecting extremity thereof; an inner wheel; a bearing collar extending from said inner wheel into said bearing sleeve and being journalled on said first set of bearings; an outer wheel; a second bearing collar extending from said outer wheel inwardly around said stub axle and being journalled on said second set of bearings; and braking means secured to said axle between the two sets of bearings.

9. A dual wheel construction for vehicles comprising: a horizontal, cup-like, bearing sleeve the outer extremity of which is open and the inner extremity of which is closed; a stub axle extending from the closed extremity axially through said sleeve and projecting from the open extremity thereof; a first set of annular wheel bearings surrounding said stub axle within said bearing sleeve; a second set of annular wheel bearings surrounding said stub axle adjacent the projecting extremity thereof; an inner wheel; a bearing collar extending from said inner wheel into said bearing sleeve and being journalled on said first set of bearings; an outer wheel; a second bearing collar extending from said outer wheel inwardly around said stub axle and being journalled on said second set of bearings; braking means secured to said axle between the two sets of bearings; and a nut on the extremity of said axle for retaining said bearings and said brake means in place.

10. A dual wheel construction for vehicles comprising: a horizontal, cup-like bearing sleeve the outer extremity of which is open and the inner extremity of which is closed; a stub axle extending from the closed extremity axially through said sleeve and projecting from the open extremity thereof; a first set of annular wheel bearings surrounding said stub axle within said bearing sleeve; a second set of annular wheel bearings surrounding said stub axle adjacent the projecting extremity thereof; an inner wheel; a bearing collar extending from said inner wheel into said bearing sleeve and being journalled on said first set of bearings; an outer wheel; a second bearing collar extending from said outer wheel inwardly around said stub axle and being journalled on said second set of bearings; a tire on the inner wheel positioned circumferentially about the bearing sleeve; and a tire on the outer wheel positioned circumferentially about the projecting stub axle.

11. A dual wheel construction for vehicles comprising: a horizontal, cup-like, bearing sleeve the outer extremity of which is open and the inner extremity of which is closed; a stub axle extending from the closed extremity axially through said sleeve and projecting from the open extremity thereof; a first set of annular wheel bearings surrounding said stub axle within said bearing sleeve; a second set of annular wheel bearings surrounding said stub axle adjacent the projecting extremity thereof; an inner wheel; a bearing collar extending from said inner wheel into said bearing sleeve and being journalled on said first set of bearings; an outer wheel; a second bearing collar extending from said outer wheel inwardly around said stub axle and being journalled on said second set of bearings; a tire on the inner wheel positioned circumferentially about the bearing sleeve; a tire on the outer wheel positioned circumferentially about the projecting stub axle; vertically positioned pivot members on said bearing sleeve; a stationary axle member; and a fork on the extremity of said axle member projecting into said inner wheel above and below said bearing sleeve and pivotaly engaging said pivots.

12. A dual wheel construction for vehicles comprising: a horizontal, cup-like, bearing sleeve the outer extremity of which is open and the inner extremity of which is closed; a stub axle extending from the closed extremity axially through said sleeve and projecting from the open extremity thereof; a first set of annular wheel bearings surrounding said stub axle within said bearing sleeve; a second set of annular wheel bearings surrounding said stub axle adjacent the projecting extremity thereof; an inner wheel; a bearing collar extending from said inner wheel into said bearing sleeve and being journalled on said first set of bearings; an outer wheel; a second bearing collar extending from said outer wheel inwardly around said stub axle and being journalled on said second set of bearings; a tire on the inner wheel positioned circumferentially about the bearings sleeve; a tire on the outer wheel positioned circumferentially about the projecting stub axle; vertically positioned pivot members on said bearing sleeve; a stationary axle member; a fork on the extremity of said axle member projecting into said inner wheel above and below said bearing sleeve and pivotally engaging said pivots; and means for swinging said bearing sleeve in a horizontal plane in said fork.

13. A dual wheel construction for vehicles comprising: a hollow member; an axle member supported by and projecting concentrically through the hollow member; a first wheel journalled on said axle member integrally of said hollow member; a second wheel positioned closely adjacent said first wheel and journalled on said axle member adjacent said first wheel so that it can be rotated independently thereof; and a substantially vertical pivot means for said hollow member positioned between the road contact planes of the two wheels to allow the latter to be rotated in a horizontal plane for steering purposes.

VACTOR G. GARNETT.
EDWARD V. GARNETT.